United States Patent [19]

Strand

[11] Patent Number: 5,790,659
[45] Date of Patent: Aug. 4, 1998

[54] SUBSCRIBER IDENTITY MODULE (SIM) CARD HOLDER

[75] Inventor: Oscar Strand, Hoor, Sweden

[73] Assignee: Telefonaktiebolaget LM Ericsson, Stockholm, Sweden

[21] Appl. No.: 705,816

[22] Filed: Aug. 30, 1996

[51] Int. Cl.[6] ........................................ H04M 1/00
[52] U.S. Cl. ........................................ 379/433; 379/434
[58] Field of Search ........................... 439/159, 152;
379/428, 429, 433, 434; 455/89, 90; 235/441,
483, 475–482, 492, 486

[56] References Cited

U.S. PATENT DOCUMENTS

| 5,257,414 | 10/1993 | Trahan et al. | 455/90 |
| 5,371,791 | 12/1994 | Schwartz et al. | 379/428 |
| 5,443,395 | 8/1995 | Wang | 439/159 |

FOREIGN PATENT DOCUMENTS 195 21 360  5/1996  Germany .

*Primary Examiner*—Jack Chiang
*Attorney, Agent, or Firm*—Burns, Doane, Swecker & Mathis, L.L.P.

[57] ABSTRACT

A SIM card holder for a cellular telephone having enclosing front and rear covers and a printed circuit board, includes a base mounted in the cover, the base having a slot for receiving a SIM card on a shelf bordered by side and end walls. The slot opens into the battery compartment of the telephone. A plurality of electrical conductors are mounted in the base, each conductor having a card contact disposed on the shelf and a terminal extending from the base for connection with the printed circuit board in the telephone. An ejector is disposed for sliding movement on the base, which includes a body having an abutment wall for cooperation with an edge of the SIM card, and a button for manipulation of the ejector, the button extending from a slot in the cover.

13 Claims, 4 Drawing Sheets

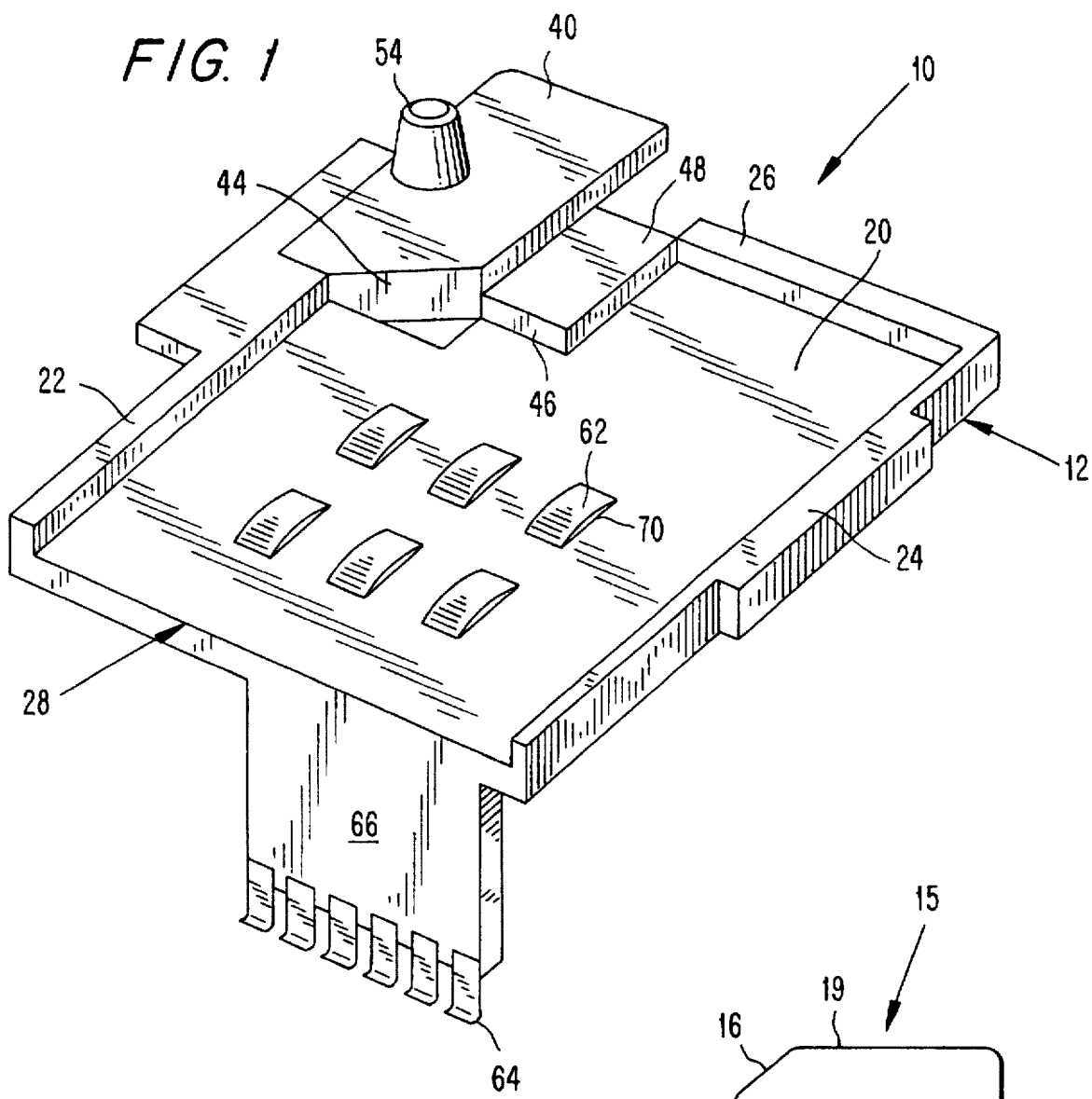
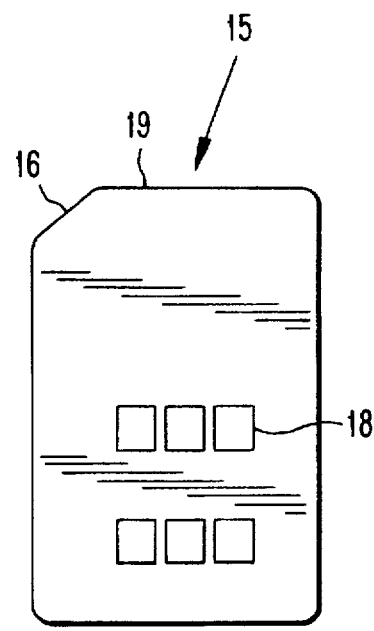

SUBSCRIBER IDENTITY MODULE (SIM) CARD HOLDER

The invention is related to radio telecommunications mobile station, for example, a cellular telephone, and more particularly, to a device for holding a SIM card in a cellular telephone.

BACKGROUND AND SUMMARY

A Subscriber Identify Module (SIM) card comprises an electronic memory chip that is connected by a mounting device to the printed circuit board in a cellular telephone. The SIM card carries information that is necessary for operating the telephone. In addition, the SIM card may contain personal information for the subscriber, for example, a listing of frequently used telephone numbers.

A known device for mounting the SIM card in a cellular telephone includes a base fixed to the printed circuit board of the telephone. The base includes pin contacts for making electrical contact with pads on the SIM card. The base is positioned in the cellular telephone with the pins soldered to connectors on the cellular telephone's printed circuit board. A cover part is attached to the base by hinges, and includes a slot in which to insert the SIM card. The cover is pivoted toward the base to place the pins in contact with the pads on the SIM card.

As efforts to miniaturize cellular telephones have proceeded, the conventional SIM card holder structure has posed difficulties. For example, soldering the SIM card holder to the printed circuit board takes up valuable space on the printed circuit board. In the event the SIM card holder must be exchanged, the solder connections must be released and connections made with the new holder. The hinged cover part of the holder also requires valuable access space in the cellular telephone structure.

The present invention provides a SIM card holder that overcomes these and other problems in the art.

According to the invention, a SIM card holder comprises a base that is mounted in a cover of a cellular telephone and is accessible through the battery compartment of the telephone. The SIM card holder includes conductors for providing electrical connection linking a SIM card to the printed circuit board. The conductors include contacts at a SIM card holding location where contact is made with pads on the SIM card and terminals extending from a support bar. The SIM card holder is mounted in the cover with the terminals disposed for connection with the printed circuit board when the front and covers of the cellular telephone are assembled.

According to the invention, the base includes a slot in which the SIM card is insertable on an inserting axis. An ejector is disposed on the base for reciprocal sliding movement on the inserting axis, and includes a knob or button which extends through a slot in the cover for manipulation of the ejector by the user. When the SIM card is inserted in the holder, the card moves the ejector to a rear position. The ejector may be moved by manipulation of the knob toward the front of the slot to push the card outward for removal from the SIM card holder.

According to the invention, the SIM card and holder include means for ensuring that the card is inserted in the correct orientation. The SIM card includes a single chamfered corner and the ejector includes a mating angled wall portion. In the correct orientation, the chamfered corner abuts the angled wall. If the card is not inserted in this orientation, the angled wall prevents the card from being fully inserted in the holder, so that the contact pads on the SIM card do not contact the conductors and a portion of the SIM card extends from the slot.

According to another aspect of the invention, the SIM card holder is mounted in the cover of the cellular telephone with the slot facing the telephone's battery compartment. When installed in the battery compartment, the battery blocks the slot entrance, and prevents access to the SIM card, thus securing the SIM card in the holder.

BRIEF DESCRIPTION OF THE DRAWINGS

The invention will become better understood by reference to the following detailed description in conjunction with the appended drawings, in which like elements are identified with like reference characters, and in which:

FIG. 1 is a perspective view of a SIM card holder in accordance with the invention;

FIG. 2 is a view of a SIM card;

DETAILED DESCRIPTION

Figure 3:
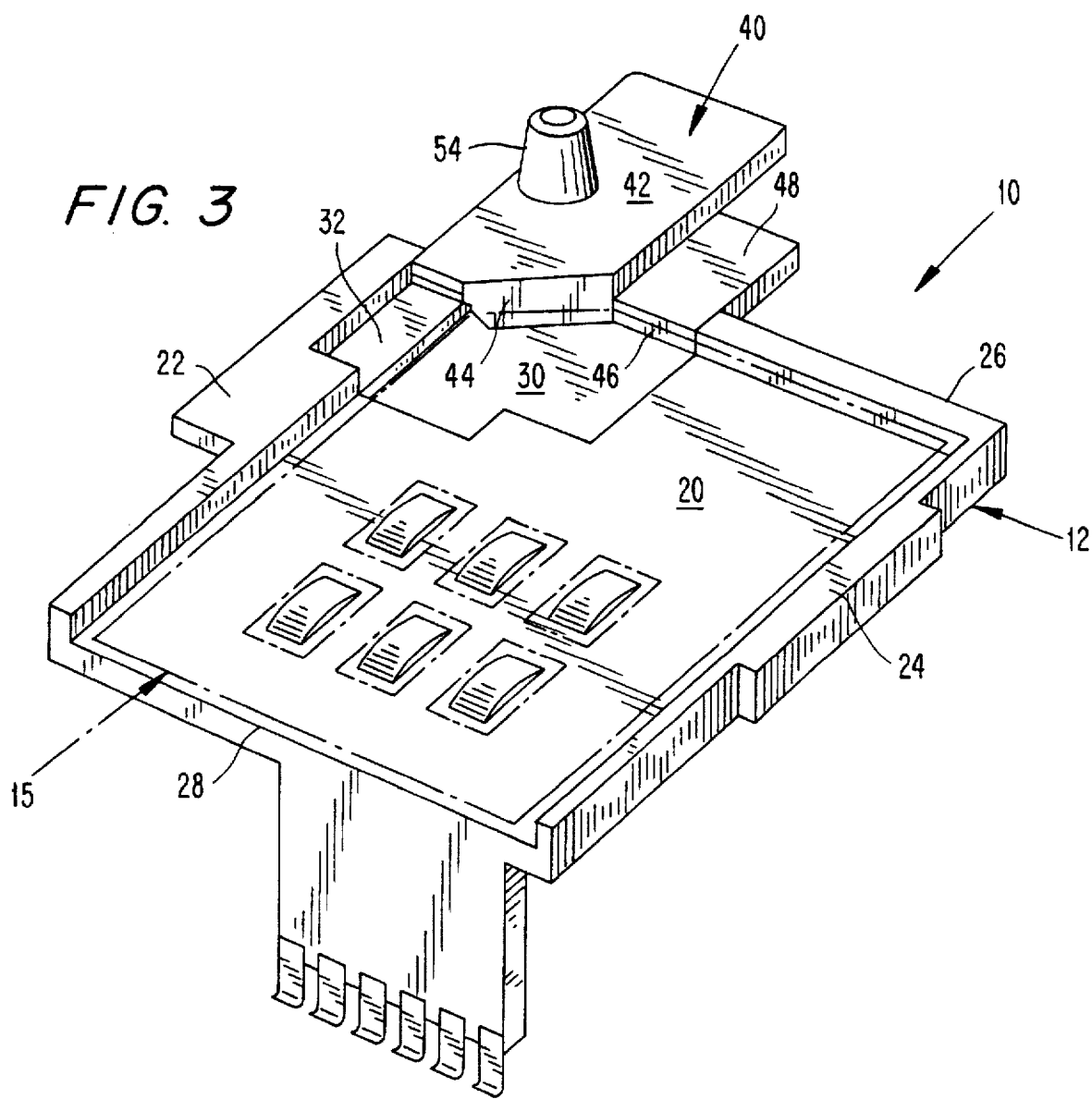
FIG. 3 shows the SIM card holder of FIG. 1 with a SIM card indicated in broken lines.

A SIM card holder 10 according to the invention is illustrated in perspective view in FIG. 1. A SIM card 15 is shown in FIG. 2. The SIM card 15 is a substantially rectangular, planar element, and includes one chamfered corner 16 for orienting the card in the card holder. A plurality of electrical contact pads 18 is formed on the surface of the SIM card 15 and connect with an electronic chip (not visible) that contains information for operating a cellular telephone.

The SIM card holder 10 is formed as a tray-like base 12 having a rectangular shelf 20 bordered by opposite side walls 22, 24 and an end wall 26. A front edge 28 of the shelf 20 is open to form a slot for receiving the SIM card in an inserting axis from the front edge to the end wall 26.

Figure 9:
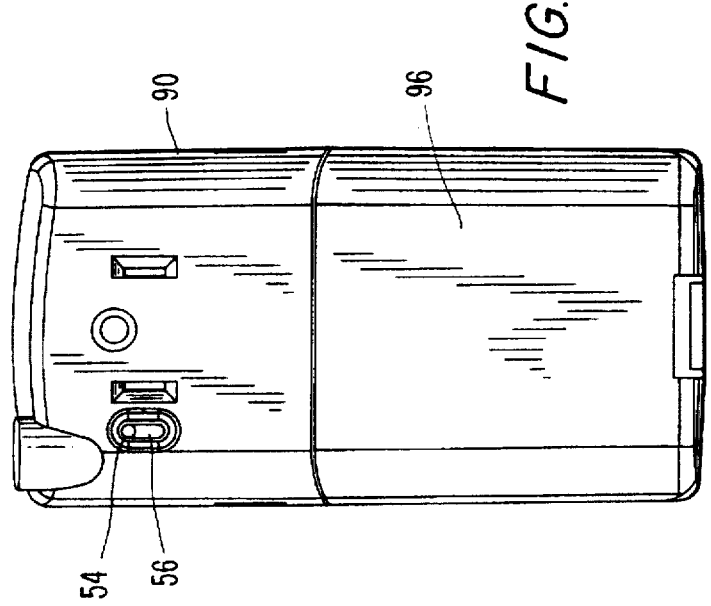
FIG. 9 is a top view of the rear cover a cellular telephone.
Figure 8:
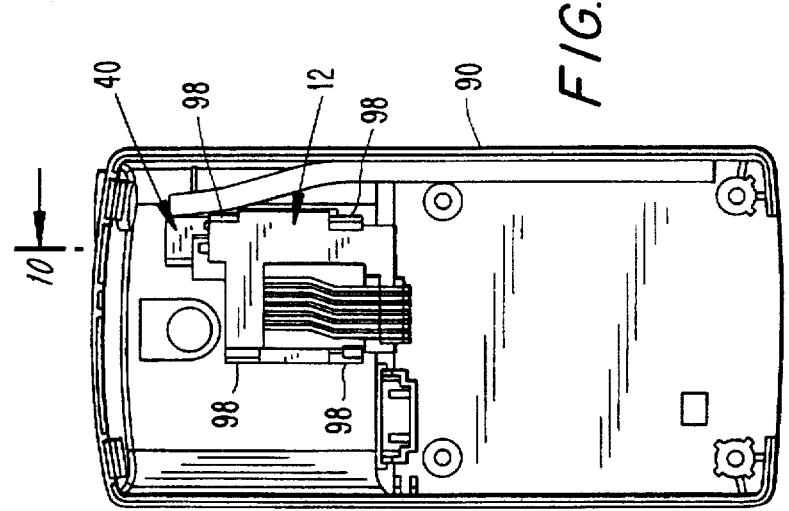
FIG. 8 is a bottom view of a rear cover of a cellular telephone with the SIM card holder mounted.
Figure 10:
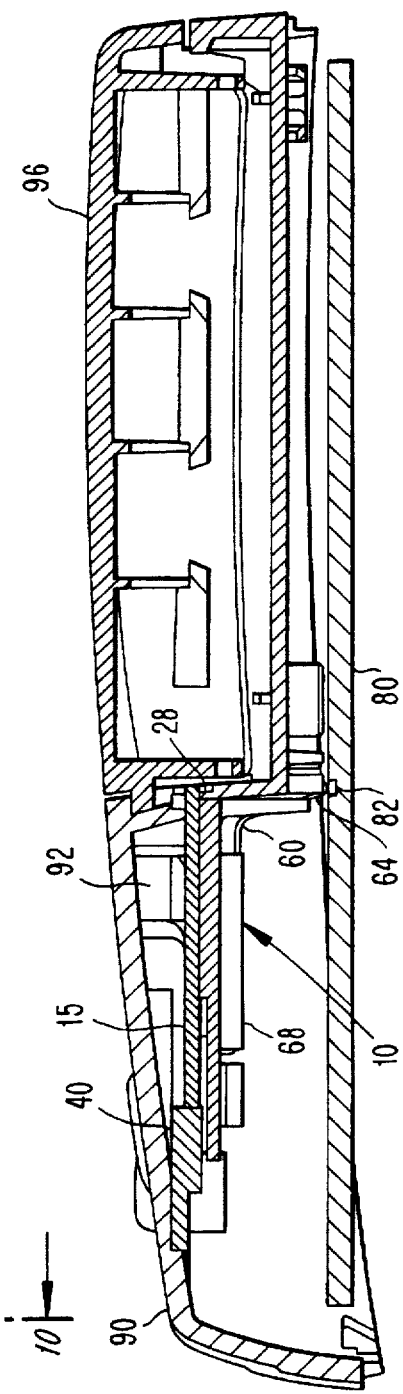
FIG. 10 is a sectional view of the rear cover of FIG. 8 taken along the line 9—9.

As shown in FIGS. 8–10, the SIM card holder 10 is mounted in a cover 90 of a cellular telephone. The illustrated embodiment shows a rear cover 90, however, the holder of the invention may be with equal advantage mounted in either a front or a rear cover. Electrical conductors 60 are provided for connecting a SIM card 15 with a printed circuit board 80 in the cellular telephone, as will be described in greater detail below. The SIM card holder 10 is mounted in the cover 90 so that the front edge 28 of the shelf 20 is positioned to open in a compartment for a battery 96. When the battery 96 is in place, as illustrated in FIG. 9 and FIG. 10, access to and removal of the SIM card 15 is prevented. This provides a measure of security, in that the SIM card may be removed only when the battery is also removed, that is, when the telephone in not operative.

An ejector 40 is disposed on the SIM card holder 10 for reciprocal sliding movement in the inserting axis. FIG. 1 shows the ejector 40 in an unloaded position closest to the front edge 28 of the shelf 20. FIG. 3 shows the SIM card holder 10 with an inserted SIM card 15 indicated by broken lines. As may be seen, the ejector 40 is in an inserted card position, pushed rearward by the SIM card 15.

Figure 4:
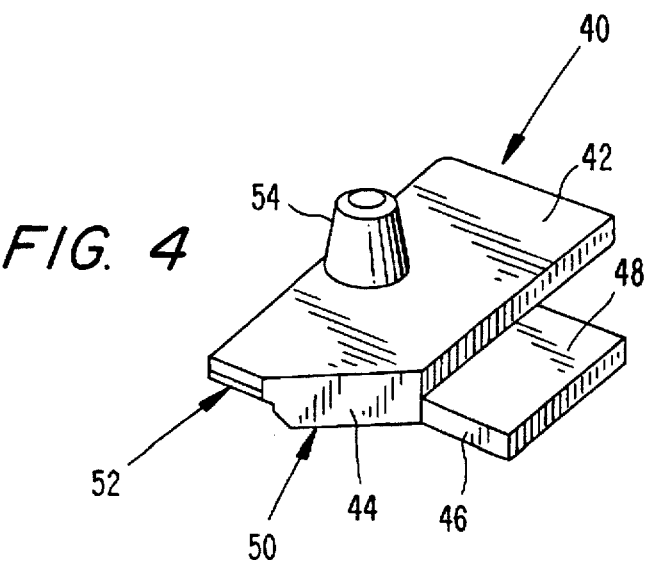
FIG. 4 is as perspective view of an ejector of the SIM card holder of FIG. 1.

Referring to FIG. 3 and FIG. 4, the ejector 40 includes a body 42 having an angled wall 44 for mating with the chamfered corner 16 of the SIM card 15 when in the inserted position and a straight wall 46 formed on a wing 48 to mate with an end edge 19 of the SIM card. The mating cooperation of the angled wall 44 and the chamfered corner 16 ensures that the SIM card is inserted in the holder in the correct orientation. As may be understood by reference to FIG. 3, if the SIM card 15 is inserted with a non-chamfered corner abutting the ejector 40, the angled wall 44 will prevent the SIM card 15 from being fully inserted in the shelf 20. A portion of the card 15 will extend from the front edge 28, giving an indication to the user of the incorrect orientation. In addition, as may be understood by reference to FIG. 10, the portion of an incorrectly inserted SIM card 15 extending from the slot of the holder 10 will extend into the battery compartment, preventing installation of the battery 96, giving further indication to the user that the SIM card is incorrectly oriented.

The base 12 of the SIM card holder 10 includes guide means for guiding the movement of the ejector 40 on the shelf 20 in the inserting axis. Shown in FIG. 3 and FIG. 5, the guide means includes a recessed portion 30 of the shelf 20 and a shoulder 32 formed in the side wall 22. The bottom surface 50 of the body 42 and the wing 48 fit in the recessed portion 30 of the shelf 20. A lip 52 extending laterally from the body 42 engages the shoulder 32 in the side wall 22.

The ejector 40 includes a button 54 by which the ejector may be manipulated. The button 54 extends through a hole 56 in the cover of a cellular telephone, illustrated in FIG. 9.

As mentioned, the SIM card holder 10 includes means for connecting a card 15 to a printed circuit board in a cellular telephone. A plurality of electrical conductors 60 is mounted in the base 12. Each conductor 60 includes a contact 62 disposed on the shelf 20 for contact with the contact pads 18 on the SIM card 15 (FIG. 2). Although six contacts 62 and contact pads 18 are illustrated, a SIM card and holder may include a different number of pads and contacts as is convenient. A terminal 64 formed on each electrical conduct 60 passes through a bar 66 extending below the front edge 28 of the base 12. A block 68 mounted on a bottom surface of the holder 12 supports the electrical conductors 60 between the shelf 20 and the bar 66. When the SIM card 15 is mounted in a cellular telephone, as shown in the view of FIG. 10, the terminals 64 of the conductors 60 contact the connectors 82 on a printed circuit board 80, thus connecting the SIM card 15 to the printed circuit board 80.

Figure 5:
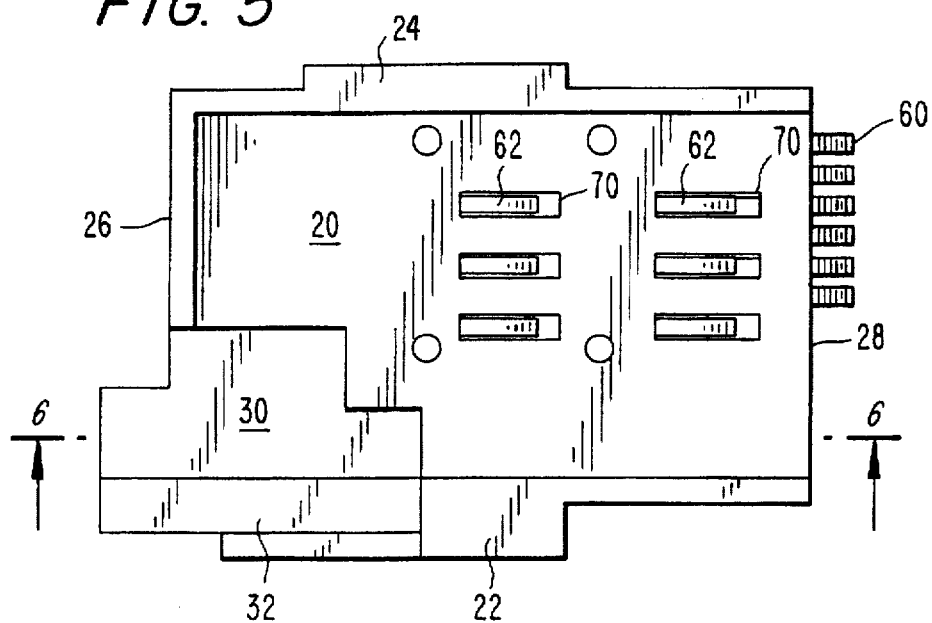
FIG. 5 is atop view of the SIM card holder of FIG. 1.

According to a preferred embodiment, the conductors 60 are each formed from a thin strip of electrically conductive material, for example, a metal. Alternatively, the conductors may be formed from wire, a conductive film, or another suitably-shaped material. Referring to FIG. 1 and FIG. 5, the contact 62 of each conductor 60 is an arcuately shaped end portion of the conductor. The contacts 62 each protrude through an aperture 70 in the shelf 20 to present a convex side on the shelf surface. The curvature of the contacts provides resiliency so that a contact 62 may be deflected or depressed into the aperture 70 and will provide a spring force acting toward the shelf surface. This ensures that the contact 62 make positive contact with the contact pads 18 on the SIM card 15. In addition, as seen in FIG. 10, the spring force from the contacts 62 acts on the SIM card 15 to retain it in position between the SIM card holder 10 and a rib 92 formed in the cover 90.

Alternatively, the conductors 60 may be formed from an electrically conductive elastomer. In such an embodiment, an elastomeric conductor may be formed with a resilient pad extending through the aperture 70 in the shelf 20. The resiliency of the elastomeric material provides the spring force to act on the contact pads of the 18 of the SIM card.

The SIM card holder 10 is mounted in the cover 90 in the illustrated embodiment by spring clips 98, shown in FIG. 8. The spring clips 98 may be formed, for example, as resilient fingers each having a barb formed on a free end. The fingers 98 bend to allow the SIM card holder 10 to be inserted in the space defined between the fingers and the barbs catch the base of the holder to secure the holder to the cover 90.

Alternatively, the cover 90 may be formed with an upstanding pin in an appropriate location that mates in a mounting hole formed in the SIM card holder 10. The SIM card holder 10 is then pushed onto the pin, and the head of the pin is heated to deform to secure the pin in the holder hole.

Figure 6:
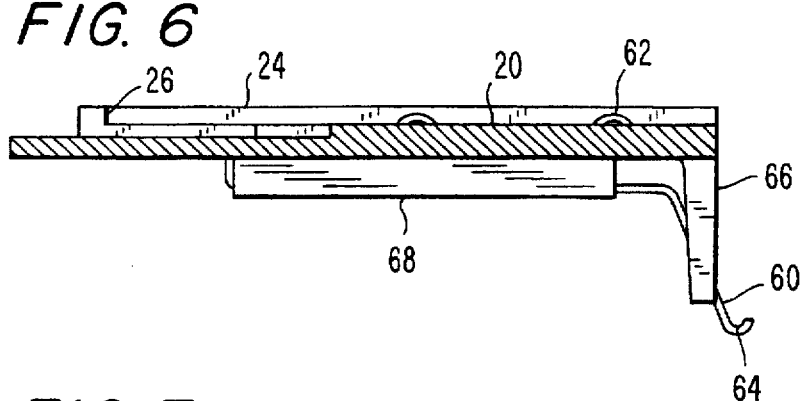
FIG. 6 is a sectional view of the SIM card holder taken along the line 6—6 in FIG. 5.
Figure 7:
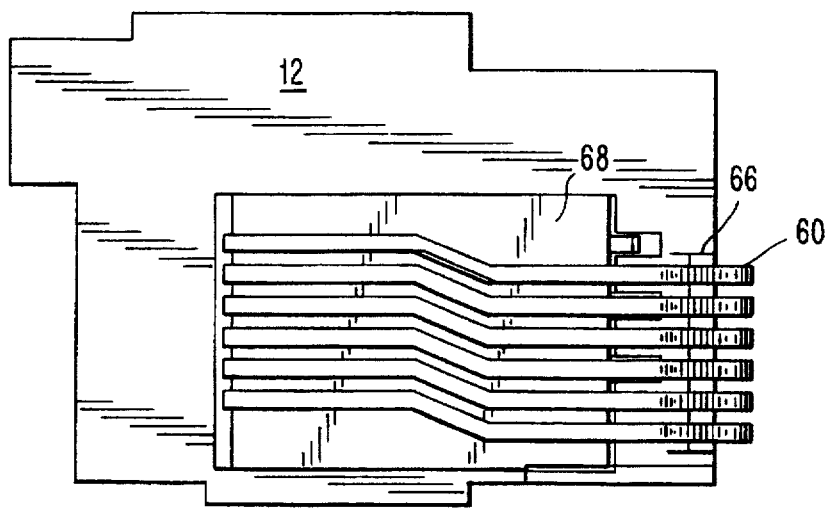
FIG. 7 is a bottom view of the SIM card holder.

As seen in FIG. 10, the terminals 64 of the conductors 60 contact the connectors 82 on the printed circuit board 80. The printed circuit board 80 is fastened or placed in a front cover (not illustrated) and the terminals 64 will make contact with the printed circuit board 80 when the front and rear covers are assembled. Alternatively, the printed circuit board may be mounted to the rear cover. As most clearly illustrated in FIG. 6, the terminals 64 are curved to provide a surface for contact with the printed circuit board 80. The ends 64 are also formed to be resilient so that contact pressure may be applied between the terminals 64 and the connectors 82 on the printed circuit board 80. Alternatively, the terminals 64 may be soldered to the printed circuit board 80 if convenient.

The invention has been described in terms of preferred embodiments, principles and components. Those skilled in the art, however, will recognize that the invention may be practiced with substitutions and equivalents other than as specifically described without departing from the scope of the invention as defined in the following claims.

What is claimed is:

1. A SIM card holder in a cellular telephone having enclosing front and rear covers and a printed circuit board, the SIM card holder comprising:

a base mounted in a cover, the base having a slot for receiving a SIM card in an axial inserting direction and forming a shelf to support the SIM card, the SIM card being insertable along an axis extending from the slot to a rear wall, the slot opening in a battery compartment of the telephone, wherein the slot is blocked by a battery positioned in said battery compartment;

a plurality of electrical conductors mounted in the base, each conductor having a card contact disposed on the shelf and a terminal extending from the base for connection with the printed circuit board; and an ejector disposed for sliding movement on the base, the ejector including a body having an abutment wall for cooperation with an edge of the SIM card, and a button for manipulation of the ejector, the button extending through a slot in the cover.

2. The SIM card holder as claimed in claim 1, wherein the card contacts resiliently protrude through apertures in the shelf.

3. The SIM card holder as claimed in claim 2, wherein the card contacts are each formed as an arcuately bent end portion of an electrical conductive strip.

4. The SIM card holder as claimed in claim 1, wherein the conductors are formed from conductive metal strips.

5. The SIM card holder as claimed in claim 1, wherein the conductors are formed from electrically conductive elastomeric material.

6. The SIM card holder as claimed in claim 1, wherein the conductors are formed from electrically conductive flexible film.

7. The SIM card holder as claimed in claim 1, wherein the cover includes snap fasteners for fastening the base to the cover.

8. The SIM card holder as claimed in claim 1, wherein the base includes side walls on opposite edges of the shelf and an end wall at an end edge of the shelf.

9. The SIM card holder as claimed in claim 1, wherein the cover includes a rib extending toward the shelf to define with the shelf a space to retain the SIM card.

10. The SIM card holder as claimed in claim 1, wherein the base includes guide means for guiding the ejector for sliding movement in a longitudinal direction of the base.

11. The SIM card holder as claimed in claim 10, wherein the guide means comprises a recess formed in the shelf and a shoulder formed at a side edge of the shelf.

12. The SIM card holder as claimed in claim 1, wherein the body of the ejector includes an angled wall portion to mate with a chamfered corner of a SIM card, the angled wall portion set oblique to the insertion direction of the base to reject an incorrectly oriented SIM card.

13. A cellular telephone, comprising:

front and rear covers defining an enclosed space;

a printed circuit board disposed in the enclosed space;

a SIM card holder comprising a base mounted in one of said covers, the base having a slot for receiving a SIM card in an inserting direction and forming a shelf to support the SIM card, the slot and shelf being aligned on an insertion axis, a plurality of electrical conductors mounted in the base, each conductor having a card contact disposed on the shelf and a terminal extending from the base for connection with the printed circuit board, and an ejector disposed for sliding movement on the base, the ejector including a body having an abutment wall for cooperation with an edge of the SIM card and a button for manipulation of the ejector, the button extending through a slot in said cover, wherein the SIM card holder is positioned so that the slot opens into a battery compartment defined by the front and rear covers, so that a battery in the battery compartment blocks the slot.

* * * * *